US007965529B2

(12) United States Patent
Gibbs et al.

(10) Patent No.: US 7,965,529 B2
(45) Date of Patent: Jun. 21, 2011

(54) VOLTAGE SOURCE INVERTER AND MEDIUM VOLTAGE PRE-CHARGE CIRCUIT THEREFOR

(75) Inventors: Irving A. Gibbs, Fletcher, NC (US); Andrew C. Stevenson, Ontario (CA)

(73) Assignee: Eaton Corporation, Cleveland, OH (US)

( * ) Notice: Subject to any disclaimer, the term of this patent is extended or adjusted under 35 U.S.C. 154(b) by 510 days.

(21) Appl. No.: 12/119,952

(22) Filed: May 13, 2008

(65) Prior Publication Data

US 2009/0284999 A1 Nov. 19, 2009

(51) Int. Cl.
*H02M 7/537* (2006.01)
*H02J 3/36* (2006.01)
*G05F 1/13* (2006.01)

(52) U.S. Cl. ............................ 363/131; 363/35; 323/248

(58) Field of Classification Search .................... 363/17, 363/21.02, 15, 34–35, 131–132; 323/247–248
See application file for complete search history.

(56) References Cited

U.S. PATENT DOCUMENTS

| 3,914,685 | A | * | 10/1975 | Van Gilder | 323/248 |
| 4,001,665 | A | * | 1/1977 | Wisner et al. | 363/93 |
| 4,030,025 | A | * | 6/1977 | Kakalec | 323/248 |
| 5,416,687 | A |   | 5/1995 | Beasley |  |
| 5,747,942 | A | * | 5/1998 | Ranganath | 315/224 |
| 6,603,216 | B2 | * | 8/2003 | Costello | 290/41 |
| 2003/0067284 | A1 | * | 4/2003 | Costello | 322/59 |

* cited by examiner

*Primary Examiner* — Gary L Laxton
*Assistant Examiner* — Jeffrey Gblende
(74) *Attorney, Agent, or Firm* — Martin J. Moran

(57) ABSTRACT

A medium voltage adjustable frequency drive includes an input isolation transformer having a three-phase input and a three-phase output, a converter having a three-phase input electrically connected to the three-phase output of the input isolation transformer and an output providing a direct current bus, an inverter having an input electrically connected to the output of the converter and a three-phase output, and a pre-charge circuit. The pre-charge circuit includes a ferro-resonant transformer circuit having a primary winding structured to input a low voltage and a secondary winding structured to output a medium voltage and provide a constant current source. The pre-charge circuit also includes a medium voltage diode bridge having an input receiving the medium voltage from the secondary winding of the ferro-resonant transformer circuit and an output structured to provide the constant current source to the direct current bus.

17 Claims, 3 Drawing Sheets

VOLTAGE SOURCE INVERTER AND MEDIUM VOLTAGE PRE-CHARGE CIRCUIT THEREFOR

BACKGROUND OF THE INVENTION

1. Field of the Invention

This invention pertains generally to voltage source inverters and, more particularly, to voltage source inverters such as, for example, medium voltage adjustable frequency drives or adjustable speed drives. The invention also pertains to medium voltage pre-charge circuits for such voltage source inverters.

2. Background Information

A voltage source inverter, such as a medium voltage adjustable frequency drive, powers a motor, such as an induction or synchronous motor, or a generator, with a suitable medium voltage.

Another example of a voltage source inverter is a variable frequency drive (VFD), which controls the rotational speed of an alternating current (AC) electric motor by controlling the frequency of the electrical power supplied to the motor. A VFD is a specific type of adjustable speed drive. VFDs are also known as adjustable frequency drives (AFDs), variable speed drives (VSDs), AC drives, microdrives or inverter drives. Since the voltage is varied along with the frequency, these are sometimes also called VVVF (variable voltage variable frequency) drives.

As shown in FIG. 1, the main components of a voltage source inverter, such as the example medium voltage adjustable frequency drive 2, include a number of input isolation transformers 4 (two example transformers 4 are shown), a converter, such as a number of rectifier bridge assemblies 6 (two example bridge assemblies 6 are shown), a direct current (DC) bus 8, associated DC bus capacitors 10,12, and an inverter 14. The DC bus capacitors 10,12 store energy and are the voltage source for the inverter 14. As is well known, an inverter, such as 14, is an electronic circuit that converts DC to AC. An inverter performs the opposite function of a rectifier and converts a DC voltage into a variable voltage, variable frequency AC voltage.

In order to turn on the example medium voltage adjustable frequency drive 2, the DC bus capacitors 10,12 must first be charged. This process is called "pre-charge". Without pre-charge, the inrush current to the medium voltage adjustable frequency drive 2 is relatively very large, may damage the number of rectifier bridge assemblies 6, and also may cause upstream protective relays (not shown) to operate and trip main circuit breakers (not shown).

In order to reduce the inrush current when energizing the number of input isolation transformers 4 and the number of rectifier bridge assemblies 6 that power the medium voltage adjustable frequency drive 2, the DC bus capacitors 10,12 are pre-charged. As shown in FIG. 1, a known proposal for pre-charging uses reactors (or resistors) 16 in series with the input isolation transformers 4 to limit the inrush current. Alternatively, resistor(s) can be placed in series with the output of the transformers 4, or inductor(s) can be placed in series with the transformers 4 to limit inrush. When the DC bus capacitors 10,12 are sufficiently charged, the reactors (or resistors) 16 are removed from the circuit by a medium voltage rated contactor 18.

A disadvantage of such known methods of reducing inrush current is the relatively large size and cost of the reactors (or resistors) 16 and the medium voltage rated contactor 18.

There is room for improvement in pre-charge circuits for the direct current bus of voltage source inverters.

There is also room for improvement in voltage source inverters including a pre-charge circuit.

SUMMARY OF THE INVENTION

These needs and others are met by embodiments of the invention, which provide a pre-charge circuit for a direct current bus of a voltage source inverter including a ferro-resonant transformer circuit that inputs a low voltage, outputs a medium voltage and provides a constant current source, and a medium voltage diode bridge circuit inputting the medium voltage and outputting the constant current source to the direct current bus.

In accordance with one aspect of the invention, a pre-charge circuit for a direct current bus of a voltage source inverter comprises: a ferro-resonant transformer circuit comprising a primary winding structured to input a low voltage and a secondary winding structured to output a medium voltage and provide a constant current source; and a medium voltage diode bridge circuit comprising an input receiving the medium voltage from the secondary winding of the ferro-resonant transformer circuit and an output structured to provide the constant current source to the direct current bus.

The ferro-resonant transformer circuit may further comprise a transformer including the primary winding and the secondary winding, and a capacitor tuning the transformer.

The ferro-resonant transformer circuit may be structured to disable the constant current source when the transformer saturates.

As another aspect of the invention, a voltage source inverter comprises: an input isolation transformer comprising an input and an output; a converter comprising an input electrically connected to the output of the input isolation transformer and an output providing a direct current bus; an inverter comprising an input electrically connected to the output of the converter and an output; and a pre-charge circuit comprising: a ferro-resonant transformer circuit comprising a primary winding structured to input a low voltage and a secondary winding structured to output a medium voltage and provide a constant current source, and a medium voltage diode bridge circuit comprising an input receiving the medium voltage from the secondary winding of the ferro-resonant transformer circuit and an output structured to provide the constant current source to the direct current bus.

The ferro-resonant transformer circuit may further comprise a transformer including the primary winding and the secondary winding, and a capacitor tuning the transformer.

The ferro-resonant transformer circuit may be structured to disable the constant current source when the transformer saturates.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "low voltage" shall mean any voltage that is less than about 600 $V_{RMS}$.

As employed herein, the term "medium voltage" shall mean any voltage greater than a low voltage and in the range from about 600 $V_{RMS}$ to about 38 $kV_{RMS}$.

The invention is described in association with a medium voltage adjustable frequency drive, although the invention is applicable to a wide range of voltage source inverters.

Figure 2:
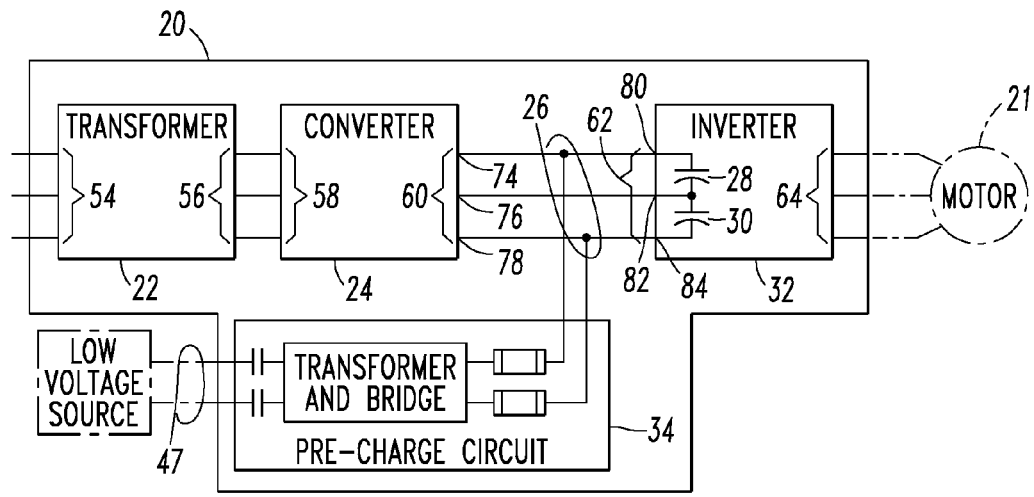
FIG. 2 is a block diagram in schematic form of a voltage source inverter including an input isolation transformer, a converter, a DC bus, associated DC bus capacitors, an inverter and a pre-charge circuit in accordance with embodiments of the invention.

Referring to FIG. 2, a voltage source inverter, such as the example medium voltage adjustable frequency drive 20 for an example three-phase motor 21 (shown in phantom line drawing) includes an input isolation transformer 22, a converter 24, a direct current (DC) bus 26, associated DC bus capacitors 28,30, an inverter 32 and a pre-charge circuit 34 for the DC bus 26.

Figure 3:
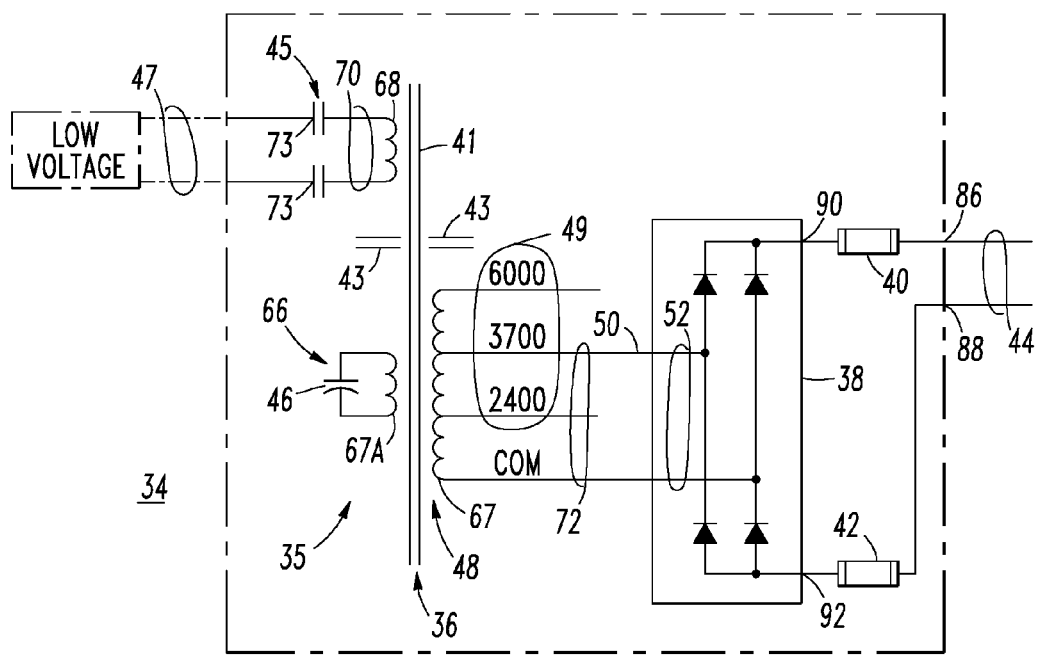
FIG. 3 is a block diagram in schematic form of the pre-charge circuit of FIG. 2.

Also referring to FIG. 3, the example pre-charge circuit 34 includes a relatively small, plural output tap, ferro-resonant transformer 36 with a relatively large turns ratio (e.g., without limitation, 2400:1; 3700:1; 6000:1) feeding a medium voltage diode bridge 38 and configured as a constant current source to charge the DC bus capacitors 28,30. When the ferro-resonant transformer 36 saturates, it stops charging the DC bus capacitors 28,30. Medium voltage fuses 40,42 (e.g., without limitation, 2 A) for the DC output 44 provide suitable circuit protection.

The pre-charge circuit 34 is preferably not decoupled from the inverter 32 and the DC bus capacitors 28,30 after those capacitors are pre-charged. Instead, a contactor 45 is used to apply or remove low voltage (e.g., without limitation, 120 VAC) power 47 (shown in phantom line drawing) to the pre-charge circuit 34. A capacitor 46 is used to tune the ferro-resonant transformer 36, as will be explained.

The secondary winding 67 of the transformer 36 includes a plurality of taps 49 and a selector 50 electrically connecting one of the taps 49 to the input 52 of the medium voltage diode bridge 38. These taps 49 provide DC bus voltage selection as needed by the corresponding application voltage. The plural output tap ferro-resonant transformer 36 may, therefore, be used for different application voltages. The selection is preferably hardwired, otherwise preconfigured, or made offline with a suitable selector, such as the example jumper 50.

A ferro-resonant transformer, such as 36, is very different from a conventional transformer and provides two very useful output modes. First, its output waveform to bridge input 52 is very close to a square wave, and its output amplitude is generally not responsive to the AC input voltage amplitude of the low voltage power 47. Second, when the ferro-resonant transformer 36 is short circuited, its output to bridge input 52 essentially becomes a constant current source.

EXAMPLE

Compared to a conventional isolation transformer, a ferro-resonant transformer, such as 36, has several main differences: (1) a linear (i.e., non-saturating) AC input (primary) winding, such as 68; (2) a resonant circuit 35 (e.g., capacitor 46 and secondary winding 67A) with a saturable magnetic structure (i.e., the core 41 of the transformer 36); and (3) a magnetic shunt 43 (non-saturating) between the low voltage input AC power 70 and the saturable magnetic structure, which has the resonant circuit 35. This saturable magnetic structure is found in close proximity to the resonant circuit 35. The resonant circuit 35 is tuned very closely to the frequency (e.g., without limitation, 60 Hz) of the input low voltage AC power 47. When excited by that frequency, the resonant circuit 35 builds up enough flux to saturate the (e.g., iron) core 41 of the ferro-resonant transformer 36 every half cycle. In every half cycle of operation, the resonant circuit energy is transferred between the capacitor 46 and the secondary winding inductance.

The capacitor 46 is electrically connected to the N-turn secondary winding 67A, whose core (not shown) is constructed with a relatively very rectangular magnetic material. The resonant frequency of the resonant circuit 35 is very close to the applied frequency (e.g., without limitation, 60 Hz) of the input low voltage AC power 47. For example, to begin a cycle, the capacitor 46 has been charged to potential Em (not shown) by a current i (not shown) which has left the core (not shown) of the winding 67A in its negative saturation region (–Øs) (not shown). The voltage Em across the capacitor 46 begins to change the flux from –Øs to +Øs (not shown). Only a negligible magnetizing current is required to produce this change, since the magnetizing curve (not shown) has a relatively steep slope.

The capacitor's voltage Em (and, thus, the ferro-resonant transformer output voltage to bridge input 52), therefore, remains substantially constant during this period. The flux, changing linearly with time, reaches +Øs in a time τ/2 (not shown), whereupon the core (not shown) of the winding 67A saturates and the process repeats in the other direction. Without excitation, oscillations would slowly decay due to the losses in the circuit. In operation, this energy is supplied by the AC primary winding 68, which is coupled through the magnetic shunt 43.

For example, the magnetic shunt 43 is material of the core 41 cut or otherwise formed to a suitable size to form a relatively lower reluctance path (or shunt path) for flux. Such core material can be, for example, layers of a suitable magnetic grade steel. As a non-limiting example, the AC primary winding (coil) 68 is disposed on the bottom portion (not shown) of the core 41. The top portion (not shown) of the transformer 36 has on the inside portion (not shown), the secondary winding (coil) 67A for the tuned capacitor 46, and on the outside portion (not shown) the high voltage secondary winding (coil) 67 with taps 49. The magnetic shunt 43 is, thus, between the primary winding 68 and the secondary windings 67,67A.

In an equivalent circuit (not shown) of the ferro-resonant transformer 36, a resistor $R_L$ (not shown) is electrically connected across the output to the bridge input 52 and represents the circuit load plus the transformer losses. A linear inductor $L_L$ (not shown) couples the AC input energy to the resonant circuit 35 (capacitor 46 and parallel inductance $L_S$ (not shown)), which is electrically connected across the output to the bridge input 52. The circuit resonant frequency is relatively very close to the excitation frequency.

Figure 4:
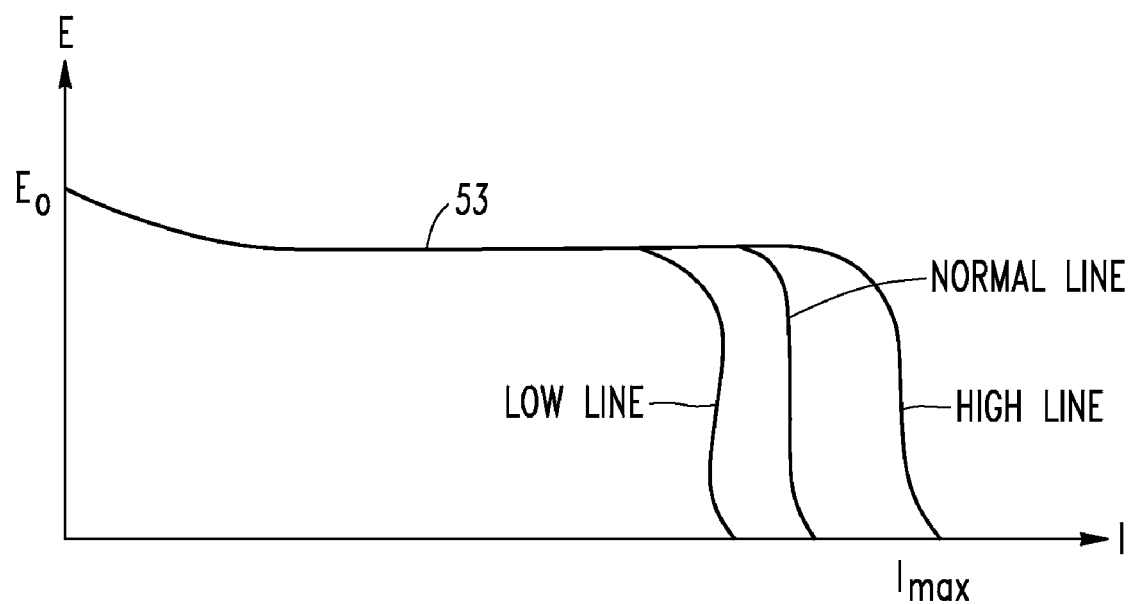
FIG. 4 is a plot of the short circuit characteristic of the ferro-resonant transformer of FIG. 3.

For a constant input frequency, the capacitor voltage (and, thus, the output voltage 53 (FIG. 4)) is essentially constant and essentially independent of the input amplitude of input voltage 70. The input linear inductance $L_L$ (not shown) must be sufficiently high in order to provide isolation from the input low voltage AC power 47, but low enough to be able to transfer enough power to maintain resonant oscillation. The ferro-resonant transformer 36 is also immune to short circuits. Whenever the output (E) to bridge input 52 is short circuited, the equivalent circuit essentially becomes the linear inductance $L_L$, which limits the current to $I_{max}$, as can be seen in FIG. 4. This characteristic gives the very desirable linear charging rate for the DC bus capacitors 28,30.

Referring again to FIG. 2, the example input isolation transformer 22 includes a three-phase input 54 and a three-phase output 56. The example converter 24 includes a three-phase input 58 electrically connected to the three-phase output 56 of the input isolation transformer 22 and a DC output 60 providing the DC bus 26. The example inverter 32 includes a DC input 62 electrically connected to the DC output 60 of the converter 24 and a three-phase output 64 structured to power a three-phase rotating electrical apparatus, such as the example motor 21 or a generator (not shown).

Referring again to FIG. 3, the transformer 36 and the capacitor 46 of the pre-charge circuit 34 form a ferro-resonant transformer circuit 66. The capacitor 46 is electrically connected to the secondary winding 67A and is used to tune the transformer 36 and the ferro-resonant transformer circuit 66. The capacitor 46 and the core 41 of the transformer 36 are tuned. The ferro-resonant transformer circuit 66 is structured to disable the constant current source when the transformer 36 saturates. The transformer 36 includes a primary winding 68 structured to input a low voltage 70, and the secondary winding 67 structured to output a medium voltage 72 and provide a constant current source. The primary winding 68 has a suitable number of first turns, the secondary winding 67 has a suitable plurality of second turns, and a ratio of the plurality of second turns to the number of first turns is at least about 2400.

The contactor 45 includes a pair of contactor contacts 73 electrically connected in series with the primary winding 68. The medium voltage diode bridge 38 includes the input 52 receiving the medium voltage 72 and the output 44 structured to provide the constant current source to the DC bus 26 of FIG. 2.

The converter output 60 of FIG. 2 includes a positive output 74, a first neutral 76 and a negative output 78. The inverter input 62 includes a positive input 80 electrically connected to the positive output 74, a second neutral 82 electrically connected to the first neutral 76, and a negative input 84 electrically connected to the negative output 78. The first DC bus capacitor 28 is electrically connected between the positive input 80 and the second neutral 82 and the second DC bus capacitor 30 is electrically connected between the negative input 84 and the second neutral 82.

The medium voltage diode bridge 38 of FIG. 3 includes a positive output 86 electrically connected to the positive input 80 of FIG. 2 and a negative output 88 electrically connected to the negative input 84 of FIG. 2. A first conductor 90 is electrically connected in series with the first medium voltage fuse 40 and the positive output 86, and a second conductor 92 is electrically connected in series with the second medium voltage fuse 42 and the negative output 88.

Figure 1:
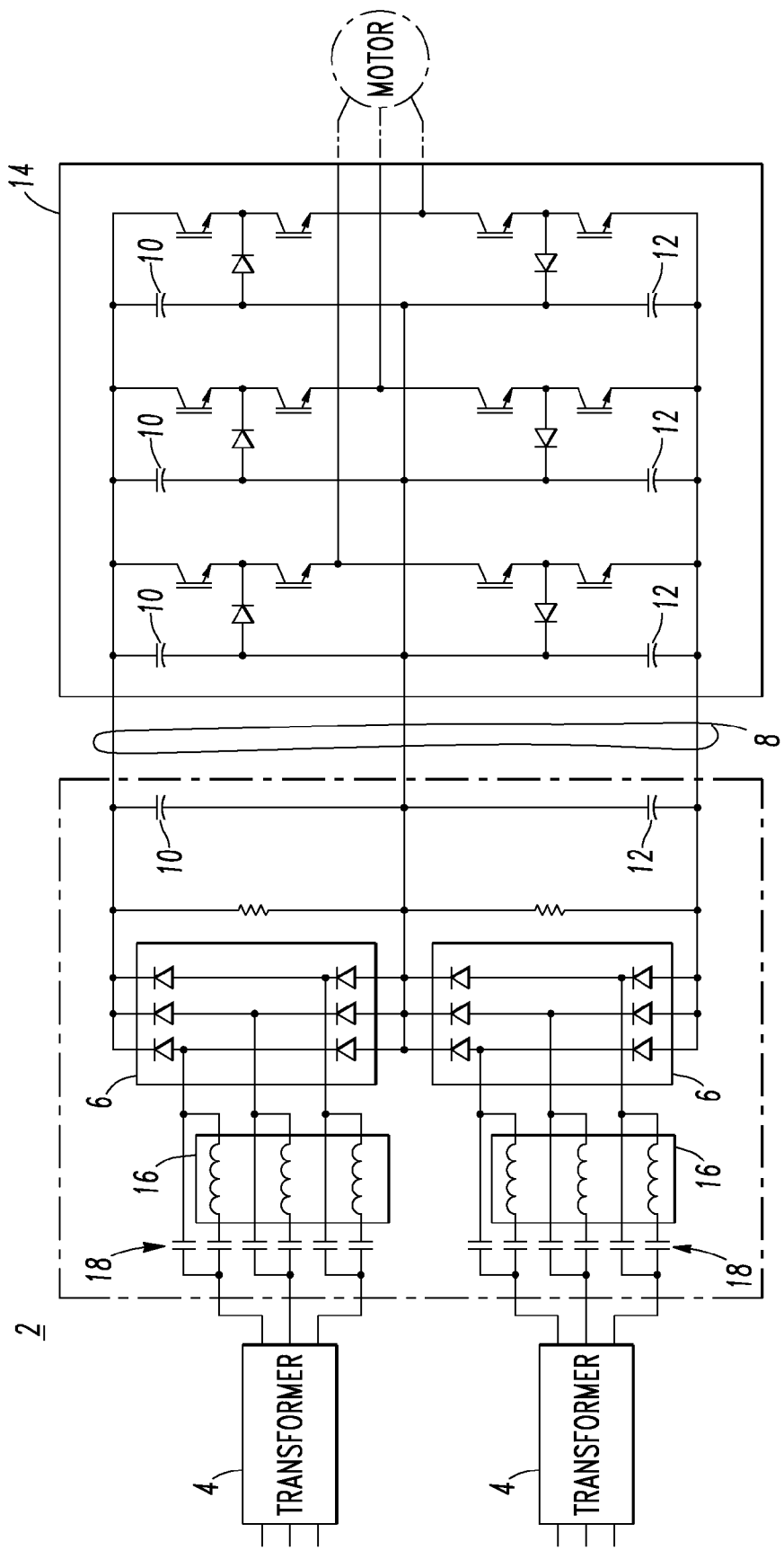
FIG. 1 is a block diagram in schematic form of a voltage source inverter including input isolation transformers, contactors, reactors, rectifier bridge assemblies, a direct current (DC) bus, associated DC bus capacitors and an inverter.

The disclosed pre-charge circuit 34 is relatively very small, can be energized and the DC bus capacitors 28,30 charged from the low voltage 70 (e.g., without limitation, 120 VAC; 240 VAC; 480 VAC; any suitable low voltage) without application of the rated drive medium voltage (e.g., without limitation, any suitable medium voltage). Furthermore, the costs associated with the example pre-charge circuit 34 are typically relatively lower than the costs associated with the reactors (or resistors) 16 (FIG. 1).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A pre-charge circuit for a direct current bus of a voltage source inverter, said pre-charge circuit comprising:
   a ferro-resonant transformer circuit comprising a primary winding structured to input a low voltage and a secondary winding structured to output a medium voltage and provide, a constant current source; and
   a medium voltage diode bridge circuit comprising an input receiving the medium voltage from the secondary winding of said ferro-resonant transformer circuit and an output structured to provide said constant current source to said direct current bus,
   wherein said ferro-resonant transformer circuit further comprises a transformer including the primary winding and the secondary winding, and a capacitor tuning said transformer, and
   wherein the primary winding has a number of first turns; wherein the secondary winding has a plurality of second turns;
   and wherein a ratio of said plurality of second turns to said number of first turns is at least about 2400.

2. The pre-charge circuit of claim 1 wherein said ratio is selected from the list consisting of about 2400, about 3700 and about 6000.

3. A pre-charge circuit for a direct current bus of a voltage source inverter, said pre-charge circuit comprising:
   a ferro-resonant transformer circuit comprising a primary winding structured to input a low voltage and a secondary winding structured to output a medium voltage and provide a constant current source; and
   a medium voltage diode bridge circuit comprising an input receiving the medium voltage from the secondary winding of said ferro-resonant transformer circuit and an output structured to provide said constant current source to said direct current bus,
   wherein said ferro-resonant transformer circuit further comprises a transformer including the primary winding and the secondary winding, and a capacitor tuning said transformer, and
   wherein said ferro-resonant transformer circuit is structured to disable said constant current source when said transformer saturates.

4. A pre-charge circuit for a direct current bus of a voltage source inverter, said pre-charge circuit comprising:
   a ferro-resonant transformer circuit comprising a primary winding structured to input a low voltage and a secondary winding structured to output a medium voltage and provide a constant current source; and
   a medium voltage diode bridge circuit comprising an input receiving the medium voltage from the secondary winding of said ferro-resonant transformer circuit and an output structured to provide said constant current source to said direct current bus,
   wherein the output of said medium voltage diode bridge circuit includes a first conductor electrically connected in series with a first medium voltage fuse and a second conductor electrically connected in series with a second medium voltage fuse.

5. The pre-charge circuit of claim 4 wherein said first conductor and said first medium voltage fuse are structured to charge a first capacitor;

and wherein said second conductor and said second medium voltage fuse are structured to charge a second capacitor.

6. A pre-charge circuit for a direct current bus of a voltage source inverter, said pre-charge circuit comprising:
  a ferro-resonant transformer circuit comprising a primary winding structured to input a low voltage and a secondary winding structured to output a medium voltage and provide a constant current source;
  a medium voltage diode bridge circuit comprising an input receiving the medium voltage from the secondary winding of said ferro-resonant transformer circuit and an output structured to provide said constant current source to said direct current bus;
  wherein said ferro-resonant transformer circuit further comprises a transformer including the primary winding and the secondary winding, and a capacitor tuning said transformer; and
  wherein the secondary winding of said transformer includes a plurality of taps and a selector electrically connecting one of said taps to the input of said medium voltage diode bridge circuit.

7. The pre-charge circuit of claim 3 wherein said selector is a jumper.

8. A voltage source inverter comprising:
  an input isolation transformer comprising an input and an output;
  a converter comprising an input electrically connected to the output of said input isolation transformer and an output providing a direct current bus;
  an inverter comprising an input electrically connected to the output of said converter and an output;
  a pre-charge circuit comprising:
    a ferro-resonant transformer circuit comprising a primary winding structured to input a low voltage and a secondary winding structured to output a medium voltage and provide a constant current source,
    a medium voltage diode bridge circuit comprising an input receiving the medium voltage from the secondary winding of said ferro-resonant transformer circuit and an output structured to provide said constant current source to said direct current bus; and
  wherein the input of said input isolation transformer is a three-phase input and the output of said input isolation transformer is a three-phase output;
  wherein the input of said converter is a three-phase input and the output of said converter comprises a positive output, a first neutral and a negative output; wherein the input of said inverter comprises a positive input electrically connected to said positive output, a second neutral electrically connected to said first neutral, and a negative input electrically connected to said negative output; wherein the output of said inverter is a three-phase output structured to power a three-phase rotating electrical apparatus; and wherein the output of said medium voltage diode bridge circuit comprises a positive output electrically connected to said positive input and a negative output electrically connected to said negative input.

9. The voltage source inverter of claim 8 wherein the input of said inverter further comprises a first capacitor electrically connected between said positive input and said second neutral and a second capacitor electrically connected between said negative input and said second neutral.

10. A voltage source inverter comprising:
  an input isolation transformer comprising an input and an output;
  a converter comprising an input electrically connected to the output of said input isolation transformer and an output providing a direct current bus;
  an inverter comprising an input electrically connected to the output of said converter and an output;
  a pre-charge circuit comprising:
    a ferro-resonant transformer circuit comprising a primary winding structured to input a low voltage and a secondary winding structured to output a medium voltage and provide a constant current source,
    a medium voltage diode bridge circuit comprising an input receiving the medium voltage from the secondary winding of said ferro-resonant transformer circuit and an output structured to provide said constant current source to said direct current bus;
  wherein said ferro-resonant transformer circuit further comprises a transformer including the primary winding and the secondary winding, and a capacitor tuning said transformer; and
  wherein the secondary winding of said transformer includes a plurality of taps and a selector electrically connecting one of said taps to the input of said medium voltage diode bridge circuit.

11. The voltage source inverter of claim 10 wherein said selector is a jumper.

12. A voltage source inverter comprising:
  an input isolation transformer comprising an input and an output;
  a converter comprising an input electrically connected to the output of said input isolation transformer and an output providing a direct current bus;
  an inverter comprising an input electrically connected to the output of said converter and an output;
  a pre-charge circuit comprising:
    a ferro-resonant transformer circuit comprising a primary winding structured to input a low voltage and a secondary winding structured to output a medium voltage and provide a constant current source,
    a medium voltage diode bridge circuit comprising an input receiving the medium voltage from the secondary winding of said ferro-resonant transformer circuit and an output structured to provide said constant current source to said direct current bus;
  wherein said ferro-resonant transformer circuit further comprises a transformer including the primary winding and the secondary winding, and a capacitor tuning said transformer; and
  wherein the primary winding has a number of first turns; wherein the secondary winding has a plurality of second turns; and wherein a ratio of said plurality of second turns to said number of first turns is at least about 2400.

13. The voltage source inverter of claim 12 wherein said ratio is selected from the list consisting of about 2400, about 3700 and about 6000.

14. A voltage source inverter comprising:
  an input isolation transformer comprising an input and an output;
  a converter comprising an input electrically connected to the output of said input isolation transformer and an output providing a direct current bus;
  an inverter comprising an input electrically connected to the output of said converter and an output;
  a pre-charge circuit comprising:
    a ferro-resonant transformer circuit comprising a primary winding structured to input a low voltage and a secondary winding structured to output a medium voltage and provide a constant current source, a medium voltage diode bridge circuit comprising an input receiving the medium voltage from the secondary winding of said ferro-resonant transformer circuit and an output structured to provide said constant current source to said direct current bus;

wherein said ferro-resonant transformer circuit further comprises a transformer including the primary winding and the secondary winding, and a capacitor tuning said transformer; and wherein said ferro-resonant transformer circuit is structured to disable said constant current source when said transformer saturates.

15. A voltage source inverter comprising:

an input isolation transformer comprising an input and an output;

a converter comprising an input electrically connected to the output of said input isolation transformer and an output providing a direct current bus;

an inverter comprising an input electrically connected to the output of said converter and an output;

a pre-charge circuit comprising:
　a ferro-resonant transformer circuit comprising a primary winding structured to input a low voltage and a secondary winding structured to output a medium voltage and provide a constant current source,
　a medium voltage diode bridge circuit comprising an input receiving the medium voltage from the secondary winding of said ferro-resonant transformer circuit and an output structured to provide said constant current source to said direct current bus; and wherein the output of said medium voltage diode bridge circuit includes a first conductor electrically connected in series with a first medium voltage fuse and a second conductor electrically connected in series with a second medium voltage fuse.

16. A voltage source inverter comprising:

an input isolation transformer comprising an input and an output;

a converter comprising an input electrically connected to the output of said input isolation transformer and an output providing a direct current bus;

an inverter comprising an input electrically connected to the output of said converter and an output;

a pre-charge circuit comprising:
　a ferro-resonant transformer circuit comprising a primary winding structured to input a low voltage and a secondary winding structured to output a medium voltage and provide a constant current source,
　a medium voltage diode bridge circuit comprising an input receiving the medium voltage from the secondary winding of said ferro-resonant transformer circuit and an output structured to provide said constant current source to said direct current bus; and wherein said ferro-resonant transformer circuit further comprises a pair of contactor contacts electrically connected in series with said primary winding.

17. A voltage source inverter comprising:

an input isolation transformer comprising an input and an output;

a converter comprising an input electrically connected to the output of said input isolation transformer and an output providing a direct current bus;

an inverter comprising an input electrically connected to the output of said converter and an output;

a pre-charge circuit comprising:
　a ferro-resonant transformer circuit comprising a primary winding structured to input a low voltage and a secondary winding structured to output a medium voltage and provide a constant current source,
　a medium voltage diode bridge circuit comprising an input receiving the medium voltage from the secondary winding of said ferro-resonant transformer circuit and an output structured to provide said constant current source to said direct current bus; and wherein said secondary winding is a first secondary winding; and wherein said ferro-resonant transformer circuit further comprises:
　a transformer including the primary winding, the first secondary winding and a second secondary winding, and
　a capacitor electrically connected across the second secondary winding and being structured to tune said transformer.

* * * * *